Aug. 15, 1933.   W. D. STALEY   1,922,830
TURBIDIMETER
Filed Jan. 19, 1931
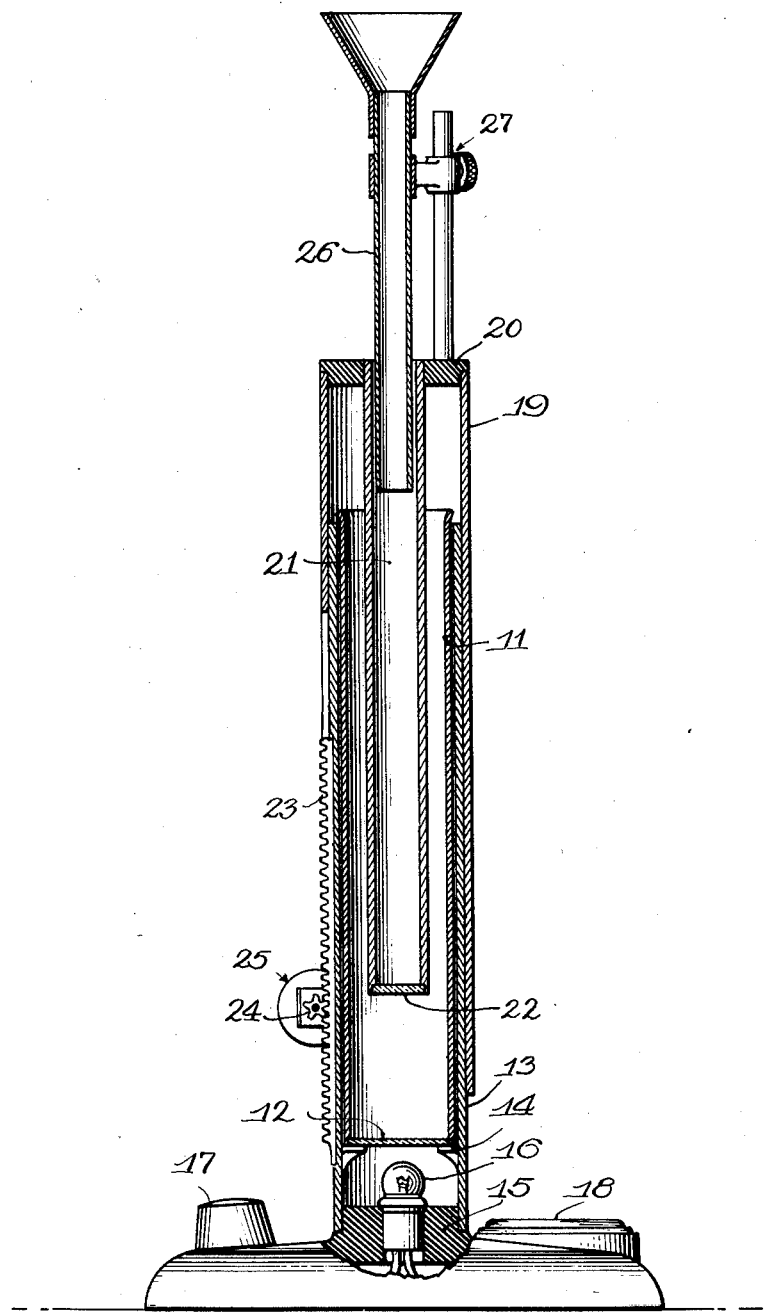
Inventor,
Wayne D. Staley
Witness:

Patented Aug. 15, 1933

1,922,830

UNITED STATES PATENT OFFICE 1,922,830

TURBIDIMETER

Wayne D. Staley, Moline, Ill., assignor, by mesne assignments, to Parr Instrument Company, Moline, Ill., a Corporation of Illinois Application January 19, 1931. Serial No. 509,594

3 Claims. (Cl. 88—14)

This invention relates to an improved method and instrument for quantitatively testing the turbidity of liquids.

It is an object of the invention to provide an improved, simple method for quantitatively determining the turbidity of liquids with solids in suspension and, it is a further object to provide an improved simplified apparatus for carrying out this method.

The invention is described in the following specification which is to be read in conjunction with the accompanying drawing which shows one embodiment of the improved turbidimeter in cross section.

Various methods have been used for determining the turbidity of liquids having finely divided solids, that may be colloidal in fineness, in suspension. Such methods are applied especially in the quantitative determination of certain chemicals and especially the $SO_4$ ion of sulfates. The $SO_4$ ion may be precipitated readily as finely divided barium sulfate which usually remains in suspension for a long period of time. By comparing the turbidity of such a suspension of barium sulfate obtained with an unknown quantity of soluble sulfate to that obtained under comparable conditions from a known quantity, it is possible to determine rapidly and easily the quantity of the $SO_4$ present.

To carry out my new method for determining the relative turbidity of a turbid solution, I prefer using the instrument shown in cross section in the accompanying drawing. This construction may be varied considerably as to details. The turbid solution is poured into a circular liquid container 11 having a transparent bottom 12, preferably flat, and preferably made of optical glass. The side walls may be made of metal, bakelite, hard rubber or any other suitable material, the materials of construction being selected to suit the liquid to be used therein. This liquid container is mounted in a surrounding casing 13, preferably resting on a ledge 14 a short distance from the base 15 in which the casing is mounted. The casing is made preferably of metal such as brass. Below the transparent bottom of the container 11 there is placed a filament of light such as is furnished by the lighted filament of an incandescent bulb 16 and especially the S shaped filament of a low-voltage bulb used in dry-cell flashlights. The bulb is mounted in an upright position as shown. The voltage is controlled by means of a rheostat 17 and a voltmeter 18 so that the intensity of the filament of light may be controlled. It is usually desirable, but not necessary, to have a filament of light of constant intensity for comparative readings. Other means may be used for obtaining a filament of light which is to be projected up through the transparent bottom 12 and into the turbid liquid in the container 11; for instance, an opaque bottom having a narrow transparent slit of any suitable shape may be substituted for the transparent bottom 12. Any suitable source of light may then be substituted for bulb 16.

In my improved method for obtaining the relative turbidity of a turbid liquid, I determine either the depth of the turbid liquid in container 11 at which the filament of light underneath becomes indistinguishable from the surrounding field as the depth of the liquid increases when observed through the open top of the container, or I determine the depth of the turbid liquid at which the filament of light just becomes distinguishable as the depth of liquid decreases. This depth should be the same in both cases and is called the point of translucency. When enough of the particles in the turbid liquid, as the depth increases, come between the eye of the observer and the filament of light, the filament becomes indistinguishable. This point is definite. The surrounding field of liquid is usually lighted to a slight extent by diffused light caused by the reflection of light from the particles causing turbidity so that the filament disappears when it becomes equal in intensity to that of the surrounding field of diffused light. The converse is true as the depth of liquid decreases. This point is very definite and may be obtained by gradually increasing the depth of the liquid until the filament becomes indistinguishable. The entire field has a translucent appearance at this depth. The depth of the liquid at this point is then measured and is a relative measure of the turbidity.

It is obvious that the point of translucency may be obtained either by gradually pouring or removing the turbid liquid into or from container 11 until the correct depth of liquid is found, that is, the depth at the point of translucency. However, such a method has many obvious disadvantages. The apparatus shown in the drawing overcomes these difficulties and allows several check determinations to be made within a few seconds. The additional apparatus necessary consists of an inverted cylinder 19, fitting slidably over casing 13. Cylinder 19 has an apertured cap 20 at its upper end supporting tube 21 which preferably is opaque with a transparent bottom 22 which in turn is preferably flat and of optical glass. Both the tube and bottom are made of suitable materials for withstanding the action of the liquid in container 11 and in which they are immersed. As cylinder 19 slides up and down the distance between the bottoms 12 and 22 varies so that the observer looking into the open top of tube 21 observes the filament of light at 16 through varying depths of turbid liquid. The advantages of this arrangement are readily apparent.

To facilitate the operation of the instrument a rack 23 is mounted on casing 13 and engaging therewith is pinion 24 operated by hand wheel 25 mounted on said inverted cylinder 19. This arrangement gives the operator complete control over the movement of tube 21. Check determinations of the translucency point may be quickly made both as the tube is raised and lowered. For convenience a scale is mounted on casing 13 so that the depth of liquid between bottoms 12 and 22 may be read instantaneously. Where the instrument is used for but one kind of determination and the same range is covered in each determination, the scale may indicate the percentage of constituent directly. If the filament of light is observed directly through the top of tube 21, the distance between the eye and the filament varies as the tube is raised or lowered. The best results are obtained if this distance remains constant. This is accomplished by inserting an observation tube 26, having opaque walls, into tube 21 and mounting it independently thereof as by means of an adjustable bracket 27. The tube preferably has an eye cup top to exclude as much outside light as possible. It may be used also for filling container 11. Also, it is desirable to prevent the entrance of outside light into the apparatus at or near the transparent bottom 12.

It may be advantageous to use a color screen between the eye of the observer and the filament of light, to eliminate those rays of light which are undesirable. For solutions of very slight turbidity it may be desirable to place a slightly frosted glass between the filament and the solution in order that an end point may be reached within the depth of liquid in container 11. This procedure may be preferred over lowering the voltage of the lamp to darken the filament.

Although an apparatus has been described in which the observations are made through a vertical column of liquid, it is obvious that, with proper precaution to prevent any settling of particles in suspension in the turbid liquid, it is possible to design apparatus in which the observations are made through a varying horizontal depth of liquid. While visual observation is contemplated, it is possible to substitute photographic or other light sensitive means for determining the translucency point.

Throughout the claims the depth of liquid at which a filament of light becomes indistinguishable or distinguishable in the field of view is the point of translucency as hereinbefore defined regardless of whether this depth of liquid is determined while increasing or decreasing it.

I claim:

1. A turbidimeter comprising a case, an opaque open-top liquid container within said case, with a flat glass bottom located a short distance from the bottom of said case, an erect incandescent bulb mounted beneath said glass bottom, means for regulating the voltage impressed on the filament of said bulb, means inside said container comprising an axially movable open-top opaque tube with a flat glass bottom for varying the depth of liquid through which the incandescent filament of said bulb is to be observed, and means comprising a second opaque tube mounted in axial alignment with and independently of said first tube to keep the distance between said filament and the eye of the observer substantially constant during the manipulation of said first tube.

2. A turbidimeter comprising a base, a metallic circular open-top casing mounted perpendicularly on said base, an interior ledge near the foot of said casing, an open top circular liquid container with a flat glass bottom fitting within said casing resting on said ledge and projecting slightly above said casing, an inverted cylinder fitting slidably over said casing, an opaque tube with a flat glass bottom projecting into said circular container and of about the same length, mounted concentrically in said inverted cylinder by means of a flange at the top thereof, a second opaque tube projecting into said tube and mounted independently thereof, a rack on the exterior of said casing and a pinion mounted on said inverted cylinder to mesh therewith, an incandescent bulb mounted upright on said base beneath the glass bottom of said circular container, and means for regulating the voltage impressed on the filament of said bulb.

3. A turbidimeter comprising a base, a cylindrical open top casing mounted perpendicularly on said base, a circular liquid container with a flat glass bottom fitting within said casing and supported above said base, a filament of light mounted beneath said glass bottom, means inside said container comprising a opaque tube with a flat glass bottom for varying the depth of liquid through which said incandescent filament is to be observed, and means comprising a second opaque tube mounted telescopically with respect to the upper end of said first tube, and independently thereof, to keep the distance between said filament and the eye of the observer substantially constant during the manipulation of said first tube.

WAYNE D. STALEY.